(12) United States Patent
Serrano et al.

(10) Patent No.: US 11,685,380 B1
(45) Date of Patent: Jun. 27, 2023

(54) MANAGING ENGINE FIRING FRACTION CHANGES DURING GEAR SHIFTS

(71) Applicant: Tula Technology, Inc., San Jose, CA (US)

(72) Inventors: Louis J. Serrano, Los Gatos, CA (US); Xiaoping Cai, Fremont, CA (US); Andrew W. Phillips, Rochester, MI (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/576,160

(22) Filed: Jan. 14, 2022

(51) Int. Cl.
| | |
|---|---|
| *B60W 30/19* | (2012.01) |
| *F02D 41/02* | (2006.01) |
| *F02D 41/00* | (2006.01) |
| *B60W 10/06* | (2006.01) |
| *B60W 10/11* | (2012.01) |

(52) U.S. Cl.
CPC ............ *B60W 30/19* (2013.01); *B60W 10/06* (2013.01); *B60W 10/11* (2013.01); *F02D 41/0087* (2013.01); *F02D 41/0225* (2013.01); *F02D 2200/101* (2013.01); *F02D 2200/501* (2013.01)

(58) Field of Classification Search
CPC ...... B60W 10/06; B60W 10/11; B60W 30/19; B60W 2030/206; F02D 41/0087; F02D 41/0225; F02D 2200/101; F02D 2200/501
See application file for complete search history.

(56) References Cited

U.S. PATENT DOCUMENTS

| | | | |
|---|---|---|---|
| 4,434,767 A | 3/1984 | Kohama et al. |
| 4,489,695 A | 12/1984 | Kohama et al. |
| 4,509,488 A | 4/1985 | Forster et al. |
| 4,921,064 A | 5/1990 | Wazaki et al. |
| 5,374,224 A | 12/1994 | Huffmaster et al. |
| 5,377,631 A | 1/1995 | Schechter |
| 5,540,633 A | 7/1996 | Yamanaka et al. |
| 6,158,411 A | 12/2000 | Morikawa |
| 6,619,258 B2 | 9/2003 | McKay et al. |
| 7,032,581 B2 | 4/2006 | Gibson et al. |

(Continued)

FOREIGN PATENT DOCUMENTS

| | | |
|---|---|---|
| JP | 2013-142457 | 7/2013 |
| JP | 2017-044136 | 3/2017 |

(Continued)

*Primary Examiner* — Edwin A Young
(74) *Attorney, Agent, or Firm* — Beyer Law Group LLP (57) ABSTRACT

Methods and controllers for controlling engine speed to reduce NVH that occurs in conjunction with transmission shifts are described. In some embodiments, when a transmission shift to a target gear is expected, a target engine speed appropriate for the target gear is first determined. A target rate of change of the engine speed is calculated from the initial engine speed and target engine speed in conjunction with a target transition time. A target torque is then calculated from the target rate of change of engine speed. A target firing fraction or induction ratio are determined that are desired for use with the target engine speed based on the target torque. The transition to the target engine speed and target firing fraction or induction ratio are completed before the gear shift is completed. The described approaches are well suited for use during skip fire or other cylinder output level modulation operation of the engine.

25 Claims, 4 Drawing Sheets

(56) References Cited

U.S. PATENT DOCUMENTS

| | | |
|---|---|---|
| 7,063,062 B2 | 6/2006 | Lewis et al. |
| 7,066,136 B2 | 6/2006 | Ogiso |
| 7,086,386 B2 | 8/2006 | Doering |
| 7,128,044 B1 | 10/2006 | Doering et al. |
| 7,300,381 B2 | 11/2007 | Badillo et al. |
| 7,503,312 B2 | 3/2009 | Surnilla et al. |
| 7,532,972 B2 | 5/2009 | Kolmanovsky et al. |
| 7,577,510 B2 | 8/2009 | Fodor et al. |
| 7,577,511 B1 | 8/2009 | Tripathi et al. |
| 7,849,835 B2 | 12/2010 | Tripathi et al. |
| 7,886,715 B2 | 2/2011 | Tripathi et al. |
| 7,930,087 B2 | 4/2011 | Gibson et al. |
| 7,941,994 B2 | 5/2011 | Surnilla et al. |
| 7,954,474 B2 | 6/2011 | Tripathi et al. |
| 7,963,267 B2 | 6/2011 | Surnilla et al. |
| 8,047,961 B2 | 11/2011 | Jess et al. |
| 8,099,224 B2 | 1/2012 | Tripathi et al. |
| 8,131,445 B2 | 3/2012 | Tripathi et al. |
| 8,131,447 B2 | 3/2012 | Tripathi et al. |
| 8,214,127 B2 | 7/2012 | Whitney et al. |
| 8,616,181 B2 | 12/2013 | Sahandiesfanjani et al. |
| 8,701,628 B2 | 4/2014 | Tripathi et al. |
| 8,886,422 B2 | 11/2014 | Sujan et al. |
| 9,020,714 B2 | 4/2015 | Saito et al. |
| 9,086,020 B2 | 7/2015 | Tripathi et al. |
| 9,120,478 B2 | 9/2015 | Carlson et al. |
| 9,200,575 B2 | 12/2015 | Shost et al. |
| 9,200,587 B2 | 12/2015 | Serrano et al. |
| 9,328,672 B2 | 5/2016 | Serrano et al. |
| 9,341,128 B2 | 5/2016 | Hayman et al. |
| 9,387,849 B2 | 7/2016 | Soliman et al. |
| 9,399,964 B2 | 7/2016 | Younkins et al. |
| 9,512,794 B2 | 12/2016 | Serrano et al. |
| 9,650,971 B2 | 5/2017 | Pirjaberi et al. |
| 9,745,905 B2 | 8/2017 | Pirjaberi et al. |
| 9,777,658 B2 | 10/2017 | Nagashima et al. |
| 9,878,718 B2 | 1/2018 | Serrano et al. |
| 9,964,051 B2 | 5/2018 | Pirjaberi et al. |
| 10,094,313 B2 | 10/2018 | Serrano et al. |
| 10,138,860 B2 | 11/2018 | Nagashima et al. |
| 10,161,328 B2 | 12/2018 | Serrano |
| 10,611,359 B1 | 4/2020 | Cai et al. |
| 10,814,858 B2 | 10/2020 | Cai et al. |
| 11,260,844 B2 | 3/2022 | Phillips et al. |
| 2008/0288146 A1 | 11/2008 | Beechie et al. |
| 2010/0012053 A1 | 1/2010 | Surnilla et al. |
| 2010/0050993 A1 | 3/2010 | Zhao et al. |
| 2011/0239963 A1 | 10/2011 | Surnilla et al. |
| 2013/0153353 A1 | 6/2013 | Teslak et al. |
| 2015/0260117 A1 | 9/2015 | Shost et al. |
| 2015/0354470 A1 | 12/2015 | Li et al. |
| 2016/0363083 A1* | 12/2016 | Matthews ........... F02D 41/2438 |
| 2017/0030278 A1 | 2/2017 | Phillips |
| 2020/0189555 A1* | 6/2020 | Cai ...................... B60W 10/06 |
| 2020/0318566 A1* | 10/2020 | Carlson ................ F02D 13/04 |
| 2021/0001832 A1* | 1/2021 | Phillips ................ F02D 41/023 |

FOREIGN PATENT DOCUMENTS

| | | |
|---|---|---|
| WO | WO 2010/006311 | 1/2010 |
| WO | WO 2011/085383 | 7/2011 |

\* cited by examiner

MANAGING ENGINE FIRING FRACTION CHANGES DURING GEAR SHIFTS

FIELD OF THE INVENTION

The present invention relates generally to methods and arrangements for managing engine speed transitions during transmission gear shifts. Some described embodiments are particularly well adapted to manage such transitions during gear shifts that occur during skip fire or other dynamic cylinder output level modulation operation of an engine.

BACKGROUND

Fuel efficiency of many types of internal combustion engines can be substantially improved by varying the displacement of the engine. This allows for the full torque to be available when required, yet can significantly reduce pumping losses and improve thermodynamic efficiency through the use of a smaller displacement when full torque is not required. The most common method of varying the displacement of an engine involves deactivating a group of cylinders substantially simultaneously. In this approach, no fuel is delivered to the deactivated cylinders and their associated intake and exhaust valves are kept closed as long as the cylinders remain deactivated.

Another engine control approach that varies the effective displacement of an engine is referred to as "skip fire" engine control. In general, skip fire engine control contemplates selectively skipping the firing of certain cylinders during selected firing opportunities. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders firings will always be exactly the same for each engine cycle during operation in a variable displacement mode (so long as the engine remains in the same displacement mode), whereas that is often not the case during skip fire operation. For example, an 8 cylinder variable displacement engine may deactivate half of the cylinders (i.e., 4 cylinders) so that it operates using only the remaining 4 cylinders. Commercially available variable displacement engines available today typically support only two or at most three fixed mode displacements. In contrast, during skip fire engine operation, the engine is not constrained to fire the same set of cylinders each engine cycle. For example, a particular cylinder may be fired during one engine cycle and then may be skipped during the next engine cycle and then selectively skipped or fired during the next.

In general, skip fire engine operation facilitates finer control of the effective engine displacement than is possible using a conventional variable displacement approach. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns.

Many skip fire controllers are arranged to provide a set of available firing patterns, sequences or firing fractions. In some circumstances the set of available firing patterns or fractions will vary as a function of various operating parameters such as engine load, engine speed and transmission gear. Typically the available firing patterns are selected, in part, based on their noise, vibration, and harshness (NVH) characteristics. Transitions between firing fraction levels must be managed to avoid unacceptable NVH during the transition. In particular, changes in the firing fraction must be coordinated with other engine actuators to achieve smooth firing fraction transitions.

The Applicant has developed a technology referred to as dynamic skip fire in which firing decisions are made on a cylinder firing opportunity by cylinder firing opportunity basis. Various aspects of dynamic skip fire are described in a number of patents including U.S. Pat. Nos. 7,954,474, 7,886,715, 7,849,835, 7,577,511, 8,099,224, 8,131,445, 8,131,447, 8,616,181, 8,701,628, 9,086,020 9,328,672, 9,387,849, 9,399,964, 9,512,794, 9,745,905, and others, each of which is incorporated herein by reference.

In some applications referred to as multi-level skip fire, individual working cycles that are fired may be purposely operated at different cylinder outputs levels—that is, using purposefully different air charge and corresponding fueling levels. By way of example, U.S. Pat. No. 9,399,964 (which is incorporated herein by reference) describes some such approaches.

The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of cylinder output level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis.

When the use of multiple non-zero firing levels is contemplated (e.g., during multi-level skip fire or multi-charge level operation of an engine), it is often efficient to consider an effective firing fraction which correlates to the percentage or fraction of the cylinders that would be fired at a high or reference output. For example, if half of the cylinders are fired at a cylinder output level of 70% of a full firing output and the other half are fired at the full firing output level, then the effective firing fraction would be 85%. In another example, if a quarter of the cylinders are fired at a cylinder output level of 70% of a full firing output, another quarter are fired at the full firing output level, and the other half are skipped, then the effective firing fraction would be 42.5%. In yet another example, if traditional skip fire operation is used (i.e., firing a designated percentage of the firing opportunities), then the effective firing fraction may represent the percentage of the cylinders that are actually fired.

Some engines are capable of creating a braking force using compression release braking (CRB) to decrease engine speed and to slow the vehicle speed. CRB is a method of opening a cylinder exhaust valve at or near top dead center (TDC) of a compression stroke of a working cycle. Compression release braking is commonly used in heavy trucks to provide engine braking, reducing use and wear of the truck's friction brakes. With some forms of CRB, gases from the intake manifold enter the cylinder during the regular intake stroke. These gases are compressed during the compression stroke, causing the engine speed to decrease. While compressed, an exhaust valve (perhaps different from the normal exhaust valve) is released, allowing the compressed gases to enter the exhaust manifold, reducing the energy returned on the expansion stroke that would otherwise accelerate the engine. Other methods of CRB also exist. The effect is that pumping these gases through a cylinder in CRB causes the engine to decelerate or brake. In this case, an induction ratio represents the percentage of cylinders in CRB mode. Skipped cylinders operate as before, with the valves deactivated and no gases pumping through the cylinder.

We have observed that during skip fire operation of an engine, undesirable NVH can sometimes occur during transmission shifts. The present application describes engine speed control schemes that can help mitigate undesirable NVH that occur in association with, or temporally in the vicinity of, a gear shift.

SUMMARY

A variety of methods and controllers for coordinating firing fraction transitions that occur in conjunction with transmission shifts are described. In one aspect, a method is provided for managing a powertrain having an internal combustion engine and a transmission during transmission gear changes. An indication of a proposed gear change indicative of an intent to shift from a first transmission gear to a second transmission gear is received. The first transmission gear is a current operational gear. In response to the indication of the proposed gear change, a target engine speed is determined, the target engine speed being suitable for use in association with the second transmission gear after the proposed gear change is completed. A target firing fraction or induction ratio is determined after determining the target engine speed. The target firing fraction or induction ratio is suitable to adjust the speed of the engine to the target engine speed, and the target firing fraction or induction ratio is suitable for providing desired engine power output based on the target engine speed. A change to the target firing fraction or induction ratio is directed if the target firing fraction or induction ratio is different from a current firing fraction and the engine speed is adjusted to the target engine speed.

In another aspect, a method is provided for managing a powertrain having an internal combustion engine and a transmission during transmission gear changes. While operating the engine at a first effective firing fraction with the transmission in a first gear, a new desired operational gear is determined, where the desired operational gear being a second gear that is different than the first gear, the first effective firing fraction being a preferred operational firing fraction for operation in the first gear based on selected current operating parameters. Responsive to the determination of a new desired operational gear, a target engine speed that is suitable for use in association with the new desired operational gear is determined. A second effective firing fraction suitable for use in association with the new desired operational gear is then determined, where the second effective firing fraction is suitable for providing desired engine power output based on the target engine speed. A transition is made from the first effective firing fraction to the second effective firing fraction, the second effective firing fraction being different than the first effective firing fraction. The engine speed is adjusted to the target engine speed. A shift is completed from the first gear to the second gear, where the transition from the first effective firing fraction to the second effective firing fraction and the adjustment to the target engine speed are completed before the shift to the second gear is completed.

In another aspect, a method is provided managing a powertrain having an internal combustion engine and a transmission during transmission gear changes. While operating the engine at a first effective firing fraction with the transmission in a first gear, a new desired operational gear is determined. The desired operational gear is a second gear that is higher than the first gear. The first effective firing fraction is a preferred operational firing fraction for operation in the first gear based on selected current operating parameters. Responsive to the determination of a new desired operational gear, a target engine speed that is suitable for use in association with the new desired operational gear is determined. An induction ratio to decelerate an engine speed to the target engine speed is then determined. A transition is then made from the first effective firing fraction to the induction ratio. The engine speed is adjusted to the target engine speed. A shift is completed from the first gear to the second gear, where the transition from the first effective firing fraction to the induction ratio and the adjustment to the target engine speed are completed before the shift to the second gear is completed.

According to another aspect, a powertrain control system is provided for controlling the operation of a powertrain having an internal combustion engine and a transmission. The powertrain control system includes a transmission control unit and an engine control unit. The transmission control unit controls operation of the transmission including controlling gear shifts. The transmission control unit is configured to generate a proposed gear change signal indicative of an intent to shift from a first transmission gear to a second transmission gear and to cause the shift from the first transmission gear to the second transmission gear to occur, where the first transmission gear is a current operational gear. The engine control unit controls operation of the engine. In response to receiving the indication of the proposed gear change signal, the engine control unit determines a target engine speed appropriate for the second transmission gear and whether a first effective firing fraction that is a current operational effective firing fraction is suitable for use in association with the second transmission gear after the proposed gear change is completed. When it is determined that the current effective firing fraction is not suitable for use after the gear change is completed, the engine control unit directs a change to a second effective firing fraction or an induction ratio that adjusts an engine speed to the target engine speed, where the second effective firing fraction or induction ratio is different than the first effective firing fraction. The engine control unit causes the change to the second effective firing fraction or induction ratio to occur before the shift to the second transmission gear is completed, and the engine control unit adjusts an engine speed to the target engine speed.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The present invention relates generally to determining desirable engine speeds associated with gear shifts and adjusting firing fractions or induction ratios. It has been observed that undesirable NVH can sometimes occur during transmission shifts, particularly when the effective operational firing fraction changes during the transmission shift as is common in skip fire and other output level modulation operation of an internal combustion engine. The present application describes engine speed control schemes that can help mitigate undesirable NVH associated with firing fraction changes that occur in association with, or temporally in the vicinity of, a gear shift.

Many modern powertrain control systems include a transmission controller (TCU) and an engine controller (ECU) that operate fairly independently of one another. The TCU typically determines when transmission gear shifts are appropriate, directs the transmission appropriately to execute the gear shifts, and informs other vehicle components of its actions. The TCU typically makes its decisions based on information provided by the ECU and sensors indicating vehicle speed and accelerator pedal position. The TCU will also typically broadcast information about its current state so that other controllers (such as an ECU) can utilize such information in the control of their respective devices. The state information broadcast by the TCU may include information such as: the actual (current) gear; a target gear (when a decision has been made to shift to a different gear); and a shift in progress indicator—which indicates that the transmission is currently in the process of shifting gears. Such information may be broadcast over a suitable vehicle bus such as a controller area network (CAN) bus.

Figure 1:
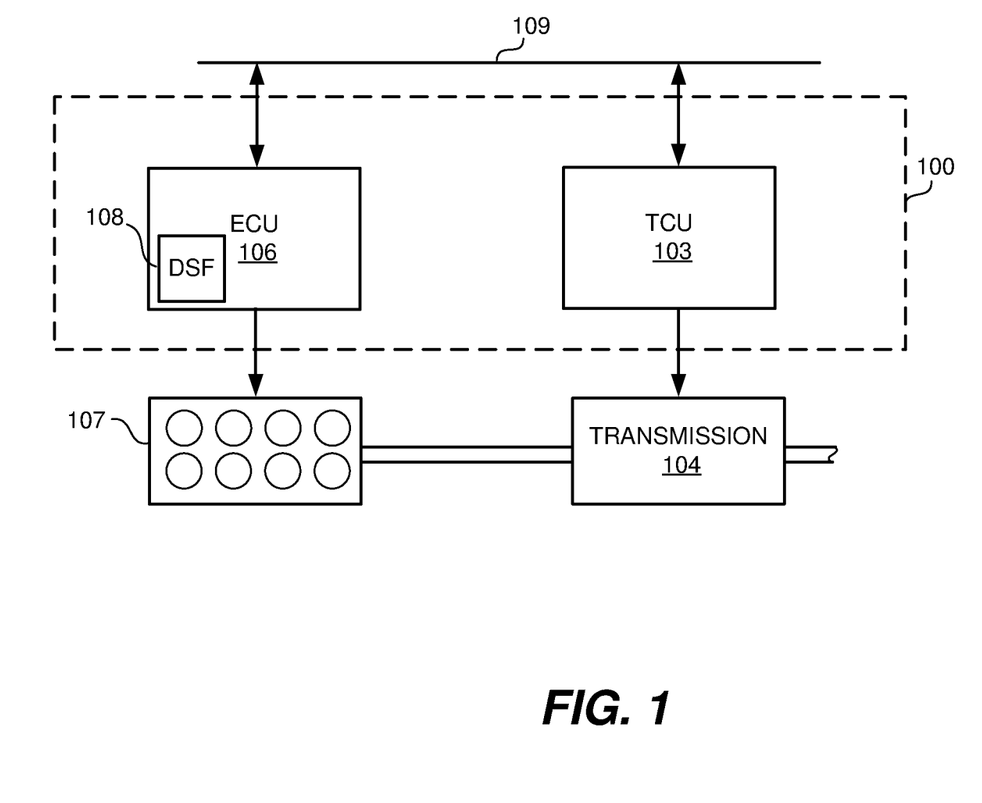
FIG. 1 is a block diagram of a power train control system.

FIG. 1 is a block diagram that diagrammatically illustrates a representative powertrain control module (PCM) 100 that includes a transmission control unit (TCU) 103 and an engine control (ECU) 106. The TCU 103 is configured to control automatic transmission 104. The ECU 106 is configured to control engine 107 and is capable of directing skip fire and/or other cylinder output level modulation operation of the engine or CRB. In some embodiments the ECU includes a dedicated skip fire control block 108 that manages skip fire operation of the engine. In the illustrated embodiment skip fire control block 108 implements dynamic skip fire control, which optionally can take a form as described in some of the incorporated patents. In other embodiments, control block 108 may manage other cylinder output level modulation of the engine (e.g., firing level modulation engine operations, etc.). The ECU and TCU (as well as other vehicle controllers) are able to communicate with one another over vehicle bus 109.

As suggested above, firing fraction changes that occur during gear shifts can sometimes lead to undesirable NVH characteristics. Gear shifts may occur under a variety of different operating conditions and the NVH impacts may vary significantly with the conditions under which the shift occurs. In general, there are up-shifts where the transmission shifts to a higher gear, and downshifts, where the transmission shifts to a lower gear. During up-shifts, the engine speed typically drops, and during downshifts, the engine speed typically increases. If no action to control engine speed is taken, this change in engine speed due to gear change occurs when the engine is reengaged to the vehicle, the change in engine speed being matched by a sudden change in vehicle speed to compensate. This sudden decrease in vehicle speed can be sensed as a jerk (NVH) by the vehicle occupant. During a downshift, the engine speed typically increases and if this change occurs when the engine is reengaged, the vehicle will experience a jerk of deceleration. Typically, when an up-shift occurs during skip fire engine operation at a moderate requested power level, it is often desirable to increase the operational firing fraction in conjunction with the shift to maintain acceptable NVH characteristics, and, as appropriate, a somewhat consistent power output at the reduced engine speed.

In an automatic transmission, there are different phases of a typical shift operation. For the purposes of this description, we will consider three distinct phases of interest which, are referred to as: (1) the fill phase; (2) the torque phase; and (3) the inertia or speed phase. During power-on up-shifts, the three phases typically occur in that order. However, in other types of shifts, the order of the phases may vary and/or different, more or fewer phases, may be included. In the example, the fill phase refers to the time period required to pressurize the hydraulics to the level necessary to activate any relevant clutches. The torque phase refers to the period where the capacity of the clutches associated with the initial and target gears are swapped. That is, the period in which the transmission load is transferred from a clutch associated with the initial gear to a clutch associated with the target gear. At the end of the torque phase, the target gear clutch supports the entire load thereby relieving the initial gear clutch of its load entirely. The inertia/speed phase is the period in which the slip of the target gear clutch is gradually reduced to zero (or its operational slip level) thereby synchronizing the engine speed with the appropriate components of the transmission.

The timing of the various shift phases may vary. By way of example, in some implementations, the fill phase may be on the order of 150 ms, the torque phase on the order of 200-300 ms and the inertia/speed phase on the order of 300-600 ms.

Other types of transmissions are manual (MT) and automatic-manual transmissions (AMT). In these types, a mechanical clutch is used and is operated either by the driver (MT) or computer controlled (AMT). When declutched, the engine is no longer coupled to the drive train. As the engine is re-clutched to the drive train, the clutch slips, until the engine speed and wheel speed are in the ratio dictated by the current gearing.

If an engine speed appropriate for the target gear is selected, and a firing fraction or induction ratio is selected to match the engine speed, then NVH is reduced. Thus, managing the engine speed (and subsequently matching the firing fraction or induction ratio) during a gear shift will help reduce NVH. It will be understood that adjusting the engine speed may require transitioning to a different firing fraction or induction ratio.

Figure 2:
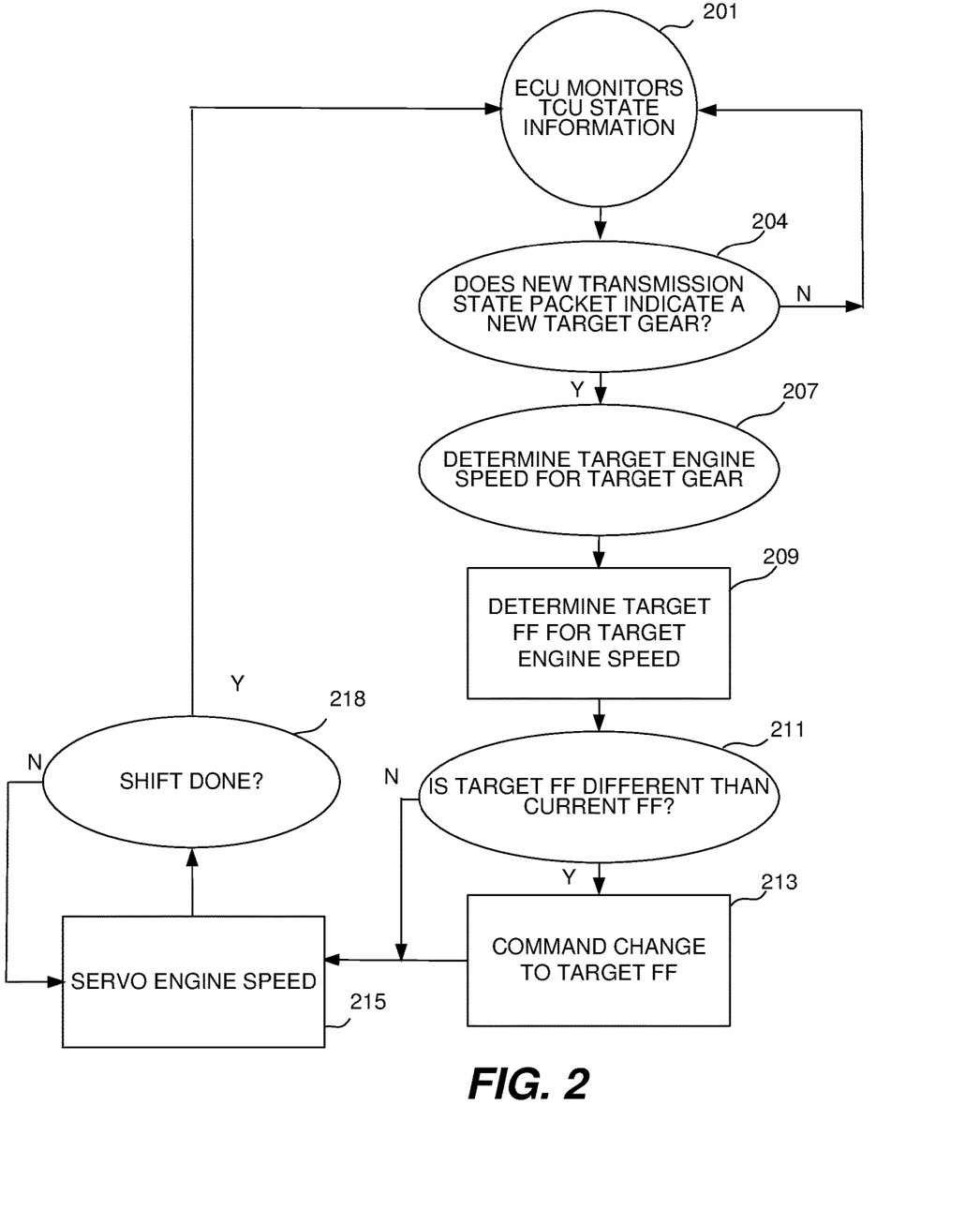
FIG. 2 is a flow chart illustrating a method of managing engine speed affiliated with gear shifts in accordance with an embodiment.

According to an embodiment shown in FIG. 2, the ECU 106 (or other skip fire or cylinder output modulation controller) monitors the state information provided by the TCU 103, as represented by block 201. This may be accomplished by monitoring for transmission status updates on the CAN bus or any other vehicle bus or communication line that the TCU broadcasts on/transmits information over. Each time the ECU receives a transmission status packet, the ECU checks to determine whether the TCU has indicated a new target gear (decision block 204). If not, the ECU continues to monitor for an indication of a new target gear.

When the ECU detects that the TCU has identified a new target gear, the ECU calculates a target engine speed to match the target gear (block 207). When the vehicle speed, gear ratio, and current gear are known, the current engine speed can be calculated. Thus, if the gear is to be shifted to a target gear, the target engine speed can be deduced.

As noted above, if an engine speed appropriate for the target gear is selected, and a firing fraction or induction ratio is subsequently selected to match the engine speed, then NVH is reduced. During a gear shift when the clutch is disengaged and the driver does not actively accelerate the engine, the engine decelerates due to engine friction as well as pumping losses. As the new gear engages, the engine then accelerates or decelerates (due to friction in the clutch) to match the vehicle speed. Thus, as the new gear engages, the vehicle speed will also change to match the engine speed, thereby causing some undesirable NVH during gear changes. According to the embodiment of FIG. 2, the ECU then determines the target firing fraction, which is the firing fraction (or effective firing fraction) that would be appropriate provide the desired engine power output (to smoothly match the calculated target engine speed) as represented by block 209.

The ECU then determines whether the target firing fraction is different from the current firing fraction as represented by block 211. If the ECU determines that the target firing fraction is different from the current firing fraction, then a transition is made to the target firing fraction as represented by block 213, and a signal is then sent to the servo attached to the engine to adjust the engine speed to the target engine speed, as represented by block 215. If the ECU determines that the target firing fraction is the same as the current firing fraction, then a signal is sent to the servo attached to the engine to adjust the engine speed to the target ending speed as represented by block 215. After the signal has been sent to adjust the engine speed, the ECU checks whether the gear shift transition is completed, as represented by block 218. If it is determined that the gear shift transition is completed, the logic continues to monitor the CAN bus or other appropriate vehicle bus or signal lines for further status updates from the TCU. If the gear shift transition is not completed, then a signal is sent again to adjust the engine speed to the target engine speed and is repeated until the gear shift transition is completed.

Figure 3:
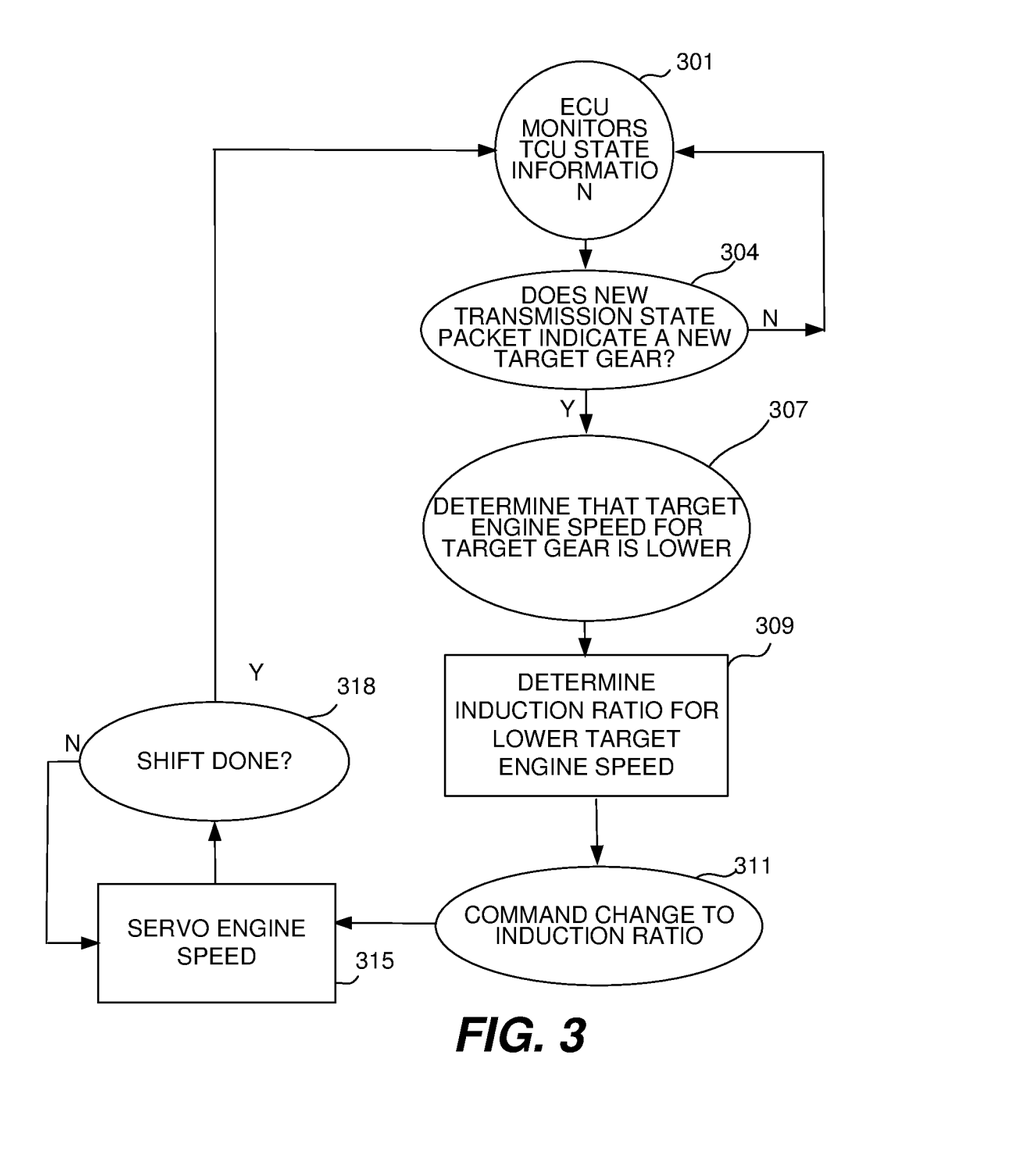
FIG. 3 is a flow chart illustrating a method of managing engine speed affiliated with gear shifts in accordance with another embodiment.

In another embodiment, as shown in FIG. 3, rather than determining a new firing fraction, an induction ratio is selected that would be appropriate for a lower engine speed. Thus, if the target gear is higher, then the engine speed appropriate for the higher target gear will be a lower engine speed. An induction ratio can be selected to help decelerate the engine. The induction ratio is the fraction of braking cylinders (cylinders through which gases are pumped). It will be understood that fuel is not injected into these braking cylinders and, in this case, the firing fraction is zero. As discussed above, pumping gases through cylinders can decelerate the engine in CRB, which is often used in diesel engines. In a spark ignited engine, such pumping results in pumping losses sufficient to brake the engine, as the engine is usually throttled to minimize torque generation.

According to the embodiment of FIG. 3, the ECU 106 (or other skip fire or cylinder output modulation controller) monitors the state information provided by the TCU 103, as represented by block 301. This may be accomplished by monitoring for transmission status updates on the CAN bus or any other vehicle bus or communication line that the TCU broadcasts on/transmits information over. Each time the ECU receives a transmission status packet, the ECU checks to determine whether the TCU has indicated a new target gear (decision block 304). If not, the ECU continues to monitor for an indication of a new target gear.

When the ECU detects that the TCU has identified a new target gear, the ECU calculates a target engine speed to match the target gear. When the vehicle speed, gear ratio, and current gear are known, the current engine speed can be calculated. Thus, if the gear is to be shifted to a target gear, the target engine speed can be deduced. According to the embodiment of FIG. 3, if the ECU calculates a lower target engine speed to match the target gear in block 307, the ECU then determines the induction ratio that would be appropriate to provide the desired engine power output to smoothly match the calculated lower target engine speed, as represented by block 309.

A transition is made to the induction ratio as represented by block 311, and a signal is then sent to the servo attached to the engine to adjust the engine speed to the target engine speed, as represented by block 315. After the induction ratio transition has been commanded and the signal has been sent to adjust the engine speed, the ECU checks whether the gear shift transition is completed, as represented by block 318. If it is determined that the gear shift transition is completed, the logic continues to monitor the CAN bus or other appropriate vehicle bus or signal lines for further status updates from the TCU. If the gear shift transition is not completed, then a signal is sent again to adjust the engine speed to the target engine speed and is repeated until the gear shift transition is completed.

According to an embodiment, if the target gear shift reflects a down-shift to a lower gear, the ECU determines a target engine speed based on the new lower gear. The ECU then determines the target firing fraction that would be appropriate for the lower target gear. It should be appreciated that when a down-shift occurs, the engine speed is expected to increase, which means that the frequency of the firing opportunities will increase and the engine needs to generate torque so that it can accelerate to the target speed.

For a spark ignited engine, in order to accomplish the increase in engine speed, just a bit of torque needs to be delivered to the engine to overcome the friction and the pumping losses. This is far less than the torque required to accelerate the vehicle. It will be appreciated that any firing fraction would work to deliver the necessary torque, as the vehicle speed is not increasing along with the increasing engine speed. It will be appreciated that in a spark ignited engine, a smaller firing fraction would be better for fuel efficiency. A smaller firing fraction is preferred for fuel efficiency because the amount of fuel must be matched to the amount of air entering each fired cylinder. The more cylinders that are fired, the more fuel consumed (and wasted in this case). Thus, for a down-shift in a spark ignited engine, the smallest firing fraction would provide the best fuel efficiency. For all fractions, excess torque can be dissipated by adjusting spark timing.

In a compression ignition engine, a smaller firing fraction is also better to minimize air flow and keep the engine after treatment (EAT) warm. However, if the engine is cold, a larger firing fraction may be used with thermal management to provide more heat energy (and change injection strategy to reduce torque). In thermal management, fuel is burned to heat the EAT. The fuel may be burned in cylinders and/or in the EAT. Thus, if the engine is warm, then it would be desirable to minimize air flow and use a smaller firing fraction. On the other hand, if the engine is cold, then it would be desirable to use more fuel and a larger firing fraction to pump more heat to the EAT system and reduce the torque in the start of injection If the target gear shift reflects an up-shift, the ECU determines a target firing fraction, which is the firing fraction (or effective firing fraction) that would be appropriate for the target gear to provide the desired engine power output. It should be appreciated that when an up-shift occurs, the engine speed is expected to decrease, which means that the frequency of the firing opportunities will decrease. Typically, the engine may go into deceleration cylinder cut off (DCCO) mode and deactivate all of the cylinders, which removes or reduces pumping losses. Thus, without the pumping losses, the engine may not slow down quickly enough because only engine friction is slowing down the engine.

Determining the target firing fraction or induction ratio can be more challenging when the target gear reflects an up-shift. For a spark ignited engine, even low firing fractions may not generate enough pumping loss. Sometimes, when the gear shift is an up-shift the vehicle speed is also accelerating. It will be appreciated that, when accelerating, the manifold may be full at the start of the shift due to torque requirements. Thus, a minimum value can be calculated to produce enough pumping loss to slow down the engine, and the best firing fraction above is selected.

For a compression ignition (CI) engine, there is some pumping loss and a firing fraction can be calculated from input pressure and exhaust pressure (scales linearly with fraction). It will be noted that NVH may be less of a concern when accelerating, as the engine speed mismatch at the end of the shift will help accelerate the vehicle. As noted above, for a CI engine, CRB can be used to decelerate the engine.

Figure 4:
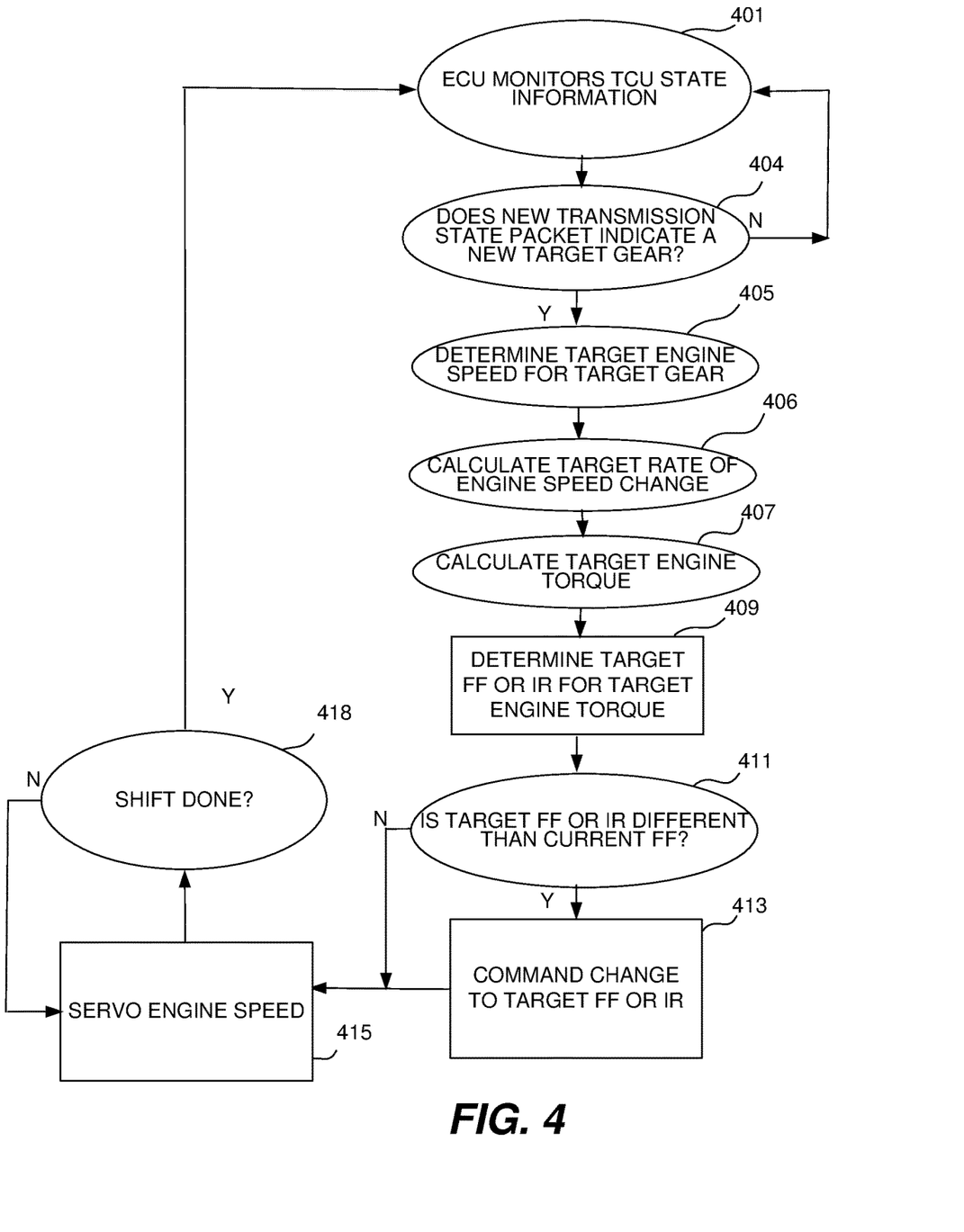
FIG. 4 is a flow chart illustrating a method of managing engine speed affiliated with gear shifts in accordance with yet another embodiment.

According to an embodiment shown in FIG. 4, the target firing fraction or induction ratio is determined based on a target torque appropriate for the target engine speed. In this embodiment, the ECU 106 (or other skip fire or cylinder output modulation controller) monitors the state information provided by the TCU 103, as represented by block 401. Each time the ECU receives a transmission status packet, the ECU checks to determine whether the TCU has indicated a new target gear (decision block 404). If not, the ECU continues to monitor for an indication of a new target gear.

When the ECU detects that the TCU has identified a new target gear, the ECU calculates a target engine speed appropriate for the target gear (block 405). To determine the target engine speed, a target rate of engine speed change is calculated from the initial engine speed and target engine speed, e.g., in conjunction with a target transition time (block 406). A target torque is then calculated from the target rate of engine speed change, e.g., in conjunction with an effective rotational inertia (block 407).

According to the embodiment of FIG. 4, the ECU then determines the target firing fraction or induction ratio based on the target torque. The target firing fraction or induction ratio is the firing fraction (or effective firing fraction) or induction ratio that would be appropriate provide the desired engine power output (to smoothly match the calculated target engine speed) as represented by block 409. The firing fraction or induction ratio for the target engine speed can be chosen in conjunction with other control parameters, such as spark or fuel injection timing, to satisfy the target torque request as efficiently as possible.

The ECU then determines whether the target firing fraction or induction ratio is different from the current firing fraction as represented by block 411. If the ECU determines that the target firing fraction or induction ratio is different from the current firing fraction, then a transition is made to the target firing fraction or induction ratio as represented by block 413, and a signal is then sent to the servo attached to the engine to adjust the engine speed to the target engine speed, as represented by block 415. If the ECU determines that the target firing fraction is the same as the current firing fraction, then a signal is sent to the servo attached to the engine to adjust the engine speed to the target ending speed as represented by block 415. After the signal has been sent to adjust the engine speed, the ECU checks whether the gear shift transition is completed, as represented by block 418. If it is determined that the gear shift transition is completed, the logic continues to monitor the CAN bus or other appropriate vehicle bus or signal lines for further status updates from the TCU. If the gear shift transition is not completed, then a signal is sent again to adjust the engine speed to the target engine speed and is repeated until the gear shift transition is completed.

According to an embodiment, the target firing fraction or induction ratio can be calculated ahead of time and then selected from a lookup table. In one embodiment, to determine the target firing fraction or induction ratio, the axes of the lookup table include starting gear and target gear. In other embodiments, the axes of the lookup table may also include starting engine speed and desire for thermal management in addition to the starting and target gears. It will be understood that the lookup table should be calibrated to the specific vehicle. Alternatively, the target firing fraction can be calculated by predicting pumping and friction losses and solving for a "best" firing fraction. A feedback control loop can be used to find the best induction ratio to decelerate the engine speed during an upshift.

It will be understood that, according to an embodiment, the same ECU can determine a target firing fraction or induction ratio by either selecting from a lookup table or by predicting pumping and friction losses and solving for the best firing fraction.

Once the target firing fraction or induction ratio is determined by the ECU, a signal is sent to the servo attached to the engine to adjust the engine to the appropriate speed. It will be appreciated that sensors measure the engine speed and actuators adjust the engine speed. In a spark ignited engine, the actuator is the spark timing, which can be used to adjust torque to control engine speed. That is, if the firing fraction is fixed, torque is adjusted to servo engine speed to the target speed. In a compression ignition engine, pumping can occur without fueling, but fuel can be added to adjust torque and/or improve thermal management.

After the firing fraction transition has been commanded, the logic continues to monitor the CAN bus or other appropriate vehicle bus or signal lines for further status updates from the TCU. In parallel, a transition is made to the new firing fraction or induction ratio.

In theory, a transition to a new firing fraction or induction ratio could be implemented essentially as a step function in which a first firing fraction is used before the transition and the target firing fraction or induction ratio is used after the transition. However, applicants have found that more gradually transitioning from the initial firing fraction to the target firing fraction or induction ratio can help mitigate NVH. By way of example, a few firing fraction transition management schemes are described in Applicant's U.S. Pat. Nos. 9,086,020; 9,200,575; 9,878,718; 10,094,313 and 10,138,860, each of which in incorporated herein by reference. Therefore, in many operational circumstances there is some time delay associated with transitioning from a first firing fraction to a different firing fraction or induction ratio.

It should be appreciated that in some operating circumstances, the target firing fraction may be the same as the current firing fraction as represented by the "no" branch from block 211. In such circumstances the firing fraction may be held constant through the end of the shift (block 218). For example, when the torque request is high at the time of the transmission up-shift, the engine may be in an all cylinder operating mode prior to the expected shift and thus the target firing fraction would be the same as the current firing fraction. In another example, the shift may occur when the engine is throttled while operating at a particularly smooth firing fraction (as for example a FP of ⅓), such that the same firing fraction can be used after the up-shift by simply increasing the cylinder torque fraction.

In another example, if the engine is operating at a high torque output at the time an up-shift is indicated by the TCU, then all of the cylinders will likely be operating (i.e., the firing fraction is 1) and thus there would be no need to change the firing fraction in connection with the shift.

Similarly, when the shift is to a lower gear (i.e., a downshift), a somewhat different control logic may be employed. In some operational circumstances, it may be desirable to use a lower firing fraction in the target gear. In such cases, the current firing fraction will be able to deliver the desired torque at the new (target) firing fraction and since the lower gear will have a higher engine speed, NVH is unlikely to be a problem if the current firing fraction is still in use when the transmission first transitions to the new engine speed. Therefore, the firing fraction may be held at the then current level until the shift is completed. After the shift is completed, normal skip fire control may be used to instigate any firing fraction change that is appropriate for operation in the new gear.

The above descriptions set forth above are primarily applicable to automatic transmissions (AT), and dual clutch transmissions (DCT). However, speculative selection of a transitional or target firing fraction can also be beneficial in the context of skip fire or other dynamic firing level modulation control of a vehicle having a manual transmission (MT). With a manual transmission, there is no TCU that broadcast its intent to initiate a gear shift. However, state information such as the current gear, target gear, and shift-in-progress can be determined by the ECU from sensors measuring clutch engagement and gear shift position. As noted above, another type of transmission is the automatic-manual transmission (AMT), where the mechanical clutch is computer controlled. When declutched, the engine is no longer coupled to the drive train. As the engine is re-clutched to the drive train, the clutch slips, until the engine speed and wheel speed are in the ratio dictated by the current gearing.

A challenge presented by manual transmission shifts is that the driver typically releases the accelerator pedal in conjunction with depressing the clutch pedal and the driver's intent is generally unknown when the clutch pedal is first depressed. For example, the driver may be intending to up-shift, to down-shift, or to remain in the same gear. Further, the driver's intended post shift accelerator pedal response is generally unknown. For example, the driver may intend to brake, coast, or aggressively accelerate after the clutch is reengaged. In some embodiments, it may be desirable to switch to all cylinder operation any time the clutch is engaged to be prepared to accommodate these different possibilities. After the shift is completed, the ECU or skip fire controller can transition to the firing fraction that is appropriate for use in conjunction with the new gear and post shift accelerator pedal position. Since the driver will often depress the accelerator pedal coming out of the shift, it can be helpful to hold the all cylinder operation for a brief period (as for example, on the order of a second) to get a better understanding of the driver's post-shift intentions before transitioning to a new firing fraction. The transition to all cylinder operation approach has the potential advantage of having the engine ready to respond to any of a variety of different post-shift scenarios. A tradeoff and potential disadvantage of such an approach is that it is less fuel efficient than might be desired. Thus, in some embodiments, it may be desirable to more actively control the firing fraction during manual transmission shifts. Also, the target gear is known prior to the clutch being re-engaged, so an appropriate firing fraction or induction ratio can be implemented at that time.

When the clutch is disengaged by driver action in preparation for a gear shift, the engine is decoupled from the transmission. Consequently, the only torque generation required is to keep the engine above an appropriate speed, such as for example, an idle speed or a stall speed. Consequently, DCCO can be used if the clutch is not disengaged for too long. In still other situations, engine speed may be reduced by activating the intake and exhaust valves on one or more cylinders without combusting fuel in the cylinders. This will pump air through the engine inducing pumping losses, which will slow the engine faster than if the engine is operated in a DCCO mode. At about the time the clutch re-engages, the skip-fire controller can change fractions to the new fraction, selected using at least in part the newly selected gear. In this fashion, all firing fraction transitions are completed while the clutch is disengaged, and consequently there is minimal NVH produced through the drive train due to firing fraction transitions. Alternatively, CRB can be used for diesel of compression ignition (CI) engines.

During a down shift (again, as determined by the change in shifter position), the engine can be automatically accelerated while the clutch is disengaged. For this, an appropriate firing density can be selected to provide the required torque to match the engine speed to the target drive train speed. The selection here will use different criteria than if the clutch is engaged, since the NVH consequences of the fraction choice are quite different (as no vibration can travel down the drivetrain). One possibility is to calculate the firing density from the torque request and air-per-cylinder, allowing any resulting firing density. At about the time the clutch re-engages, the skip-fire controller can change fractions to the new fraction, selected using at least in part the target gear, as in the up-shift case.

Although only a few embodiments of the invention have been described in detail, it should be appreciated that the invention may be implemented in many other forms without departing from the spirit or scope of the invention. For example, the invention has been described primarily in the context of skip fire operation—however it is equally applicable to gear shifts that occur during firing level modulation engine operation and other types of cylinder output level modulation. It is believed that the same approaches could also be used to manage variable displacement engine state transitions in conjunction with gear shifts as well. Also, the invention may be used with an automatic manual transmission (AMT), which has attributes of both a manual and automatic transmission. The described approaches can be implemented in a variety of powertrains including powertrains that incorporate gasoline engines, diesel engines, or other types of internal combustion engines; hybrid powertrains that include an electric motor in addition to an engine, etc.

The invention has been described primarily in conjunction with power-on up-shifts since that is the type of shift that has been observed to be most susceptible to NVH concerns caused by firing fraction transitions. However, it should be apparent that similar techniques may be used to address NVH concerns associated with firing fraction transitions that occur with any types of gear shifts and/or in association with the use of clutches utilized in other drive train components.

Although a few specific examples have been given to facilitate an understanding of the use inventions, it should be appreciated that the specific firing management schemes used as well as the specific operating conditions in which they are used may vary widely based on design goals and the characteristics of the specific engines. Therefore, the present embodiments should be considered illustrative and not restrictive and the invention is not to be limited to the details given herein, but may be modified within the scope and equivalents of the appended claims.

What is claimed is:

1. A method of managing a powertrain having an internal combustion engine and a transmission during transmission gear changes, the method comprising:
   receiving an indication of a proposed gear change indicative of an intent to shift from a first transmission gear to a second transmission gear, the first transmission gear being a current operational gear;
   in response to the indication of the proposed gear change, determining a target engine speed that is suitable for use in association with the second transmission gear after the proposed gear change is completed;
   after determining the target engine speed, determining a target firing fraction or induction ratio suitable to adjust a speed of the engine to the target engine speed, wherein the target firing fraction or induction ratio is suitable for providing desired engine power output based on the target engine speed;
   directing a change to the target firing fraction or induction ratio if the target firing fraction or induction ratio is different from a current firing fraction; and
   adjusting an engine speed to the target engine speed.

2. A method as recited in claim 1 performed during skip fire operation of the engine.

3. A method as recited in claim 1, further comprising shifting from the first transmission gear to the second transmission gear, wherein the change to the target firing fraction or induction ratio occurs before the shift to the second transmission gear is completed.

4. A method as recited in claim 1 wherein the change to the target firing fraction or induction ratio is completed before adjusting the engine speed to the target engine speed.

5. A method as recited in claim 1, wherein determining the target firing fraction or induction ratio comprises selecting the target firing fraction or induction ratio from a pre-calculated lookup table based on the first transmission gear and the second transmission gear.

6. A method as recited in claim 5, wherein the pre-calculated lookup table is further based on at least one of a current operational engine speed and thermal management.

7. A method as recited in claim 1, wherein determining the target firing fraction or induction ratio is based on a target torque calculated from a target rate of engine speed change.

8. A method as recited in claim 1, further comprising shifting from the first transmission gear to the second transmission gear, wherein adjusting the engine speed to the target engine speed occurs before the shift to the second transmission gear is completed.

9. A method as recited in claim 1, wherein determining the target engine speed comprises calculating the target engine speed based on a current vehicle speed, a gear ratio, and the second transmission gear.

10. A method as recited in claim 1, wherein the proposed gear change is an up-shift and the induction ratio is determined to decelerate the engine to the target engine speed.

11. A method as recited in claim 1, wherein the proposed gear change is a downshift and the target firing fraction is determined to accelerate the engine to the target engine speed.

12. A method as recited in claim 1 wherein:
   the indication of the proposed gear change is provided by a transmission control unit and the transmission control unit controls the shift from the first to the second transmission gear; and
   the indication of the proposed gear change is received by an engine control unit capable of directing skip fire operation of the engine, the engine control unit being configured to receive the indication of the proposed gear change, determine the target firing fraction and direct the change to the target firing fraction.

13. A method of managing a powertrain having an internal combustion engine and a transmission during transmission gear changes, the method comprising:
   while operating the engine at a first effective firing fraction with the transmission in a first gear, determining a new desired operational gear, the desired operational gear being a second gear that is different than the first gear, the first effective firing fraction being a preferred operational firing fraction for operation in the first gear based on selected current operating parameters;
   responsive to the determination of the new desired operational gear, determining a target engine speed that is suitable for use in association with the new desired operational gear;
   determining a second effective firing fraction suitable for use in association with the new desired operational gear, wherein the second effective firing fraction is suitable for providing desired engine power output based on the target engine speed;
   transitioning from the first effective firing fraction to the second effective firing fraction, the second effective firing fraction being different than the first effective firing fraction;
   adjusting an engine speed to the target engine speed;
   shifting from the first gear to the second gear, wherein the transition from the first effective firing fraction to the second effective firing fraction and the adjustment to the target engine speed are completed before the shift to the second gear is completed.

14. A method as recited in claim 13 performed during skip fire operation of the engine.

15. A method as recited in claim 13, wherein the transition to the second effective firing fraction is completed before adjusting the engine speed to the target engine speed.

16. A method as recited in claim 13, wherein determining the second effective firing fraction comprises selecting the second effective firing fraction from a pre-calculated lookup table based on the first gear and the second gear.

17. A method as recited in claim 13, wherein determining the second effective firing fraction is based on a target torque calculated from a target rate of change of the engine speed.

18. A method as recited in claim 13, wherein determining the target engine speed comprises calculating the target engine speed based on a current vehicle speed, a gear ratio, and the second gear.

19. A method as recited in claim 13, wherein:
- an indication of the new desired operational gear is provided by a transmission control unit and the transmission control unit controls the shift from the first to the second gear; and
- the indication of the new desired operational gear is received by an engine control unit capable of directing skip fire operation of the engine, the engine control unit being configured to receive the indication of the new desired operational gear, determine the second effective firing fraction and direct the change to the second effective firing fraction.

20. A method of managing a powertrain having an internal combustion engine and a transmission during transmission gear changes, the method comprising:
- while operating the engine at a first effective firing fraction with the transmission in a first gear, determining a new desired operational gear, the desired operational gear being a second gear that is higher than the first gear, the first effective firing fraction being a preferred operational firing fraction for operation in the first gear based on selected current operating parameters;
- responsive to the determination of the new desired operational gear, determining a target engine speed that is suitable for use in association with the new desired operational gear;
- determining an induction ratio to decelerate an engine speed to the target engine speed;
- transitioning from the first effective firing fraction to the induction ratio;
- adjusting the engine speed to the target engine speed;
- shifting from the first gear to the second gear, wherein the transition from the first effective firing fraction to the induction ratio and the adjustment to the target engine speed are completed before the shift to the second gear is completed.

21. A method as recited in claim 20 performed during skip fire operation of the engine.

22. A method as recited in claim 20, wherein determining the induction ratio comprises selecting the induction ratio from a pre-calculated lookup table based on the first gear and the second gear.

23. A method as recited in claim 20, wherein determining the induction ratio is based on a target torque calculated from a target rate of change of the engine speed.

24. A method as recited in claim 20, wherein determining the target engine speed comprises calculating the target engine speed based on a current vehicle speed, a gear ratio, and the second gear.

25. A powertrain control system for controlling the operation of a powertrain having an internal combustion engine and a transmission, the powertrain control system comprising:
- a transmission control unit that controls operation of the transmission including controlling gear shifts, the transmission control unit being configured to generate a proposed gear change signal indicative of an intent to shift from a first transmission gear to a second transmission gear and to cause the shift from the first transmission gear to the second transmission gear to occur, the first transmission gear being a current operational gear; and
- an engine control unit that controls operation of the engine, wherein,
  (i) in response to receiving the proposed gear change signal, the engine control unit determines a target engine speed appropriate for the second transmission gear and whether a first effective firing fraction that is a current operational effective firing fraction is suitable for use in association with the second transmission gear after the proposed gear change is completed, and
  (ii) when it is determined that the current operational effective firing fraction is not suitable for use after the gear change is completed, the engine control unit directs a change to a second effective firing fraction or an induction ratio that adjusts an engine speed to the target engine speed, the second effective firing fraction or induction ratio being different than the first effective firing fraction, the engine control unit causes the change to the second effective firing fraction or induction ratio to occur before the shift to the second transmission gear is completed, and the engine control unit adjusts the engine speed to the target engine speed.

* * * * *